(12) United States Patent
Denner

(10) Patent No.: US 9,074,916 B2
(45) Date of Patent: Jul. 7, 2015

(54) FLUID TURBINE FLOW METER

(71) Applicant: SAPPEL, Saint Louis (FR)

(72) Inventor: Bruno Denner, Riedisheim (FR)

(73) Assignee: SAPPEL (FR)

(*) Notice: Subject to any disclaimer, the term of this patent is extended or adjusted under 35 U.S.C. 154(b) by 82 days.

(21) Appl. No.: 14/053,116

(22) Filed: Oct. 14, 2013

(65) Prior Publication Data

US 2014/0102215 A1    Apr. 17, 2014

(30) Foreign Application Priority Data

Oct. 15, 2012   (FR) ...................................... 12 59793

(51) Int. Cl.
*G01F 1/05* (2006.01)
*G01F 1/10* (2006.01)
*G01F 1/06* (2006.01)

(52) U.S. Cl.
CPC ... *G01F 1/10* (2013.01); *G01F 1/06* (2013.01)

(58) Field of Classification Search
CPC ...................................... G01F 1/20; G01F 1/05
USPC .......................................... 73/861.33, 861.79
See application file for complete search history.

(56) References Cited

U.S. PATENT DOCUMENTS

| 4,561,312 | A | | 12/1985 | Roy | |
|---|---|---|---|---|---|
| 4,570,497 | A | * | 2/1986 | Han | 73/861.79 |
| 5,341,686 | A | * | 8/1994 | Chai | 73/861.33 |
| 5,636,178 | A | * | 6/1997 | Ritter | 367/83 |
| 5,866,824 | A | * | 2/1999 | Schieber | 73/861.79 |
| RE36,401 | E | * | 11/1999 | Fitzpatrick et al. | 73/300 |
| 6,345,541 | B1 | * | 2/2002 | Hendey | 73/861.79 |
| 2009/0272199 | A1 | | 11/2009 | Chamosset et al. | |

FOREIGN PATENT DOCUMENTS

DE     4114978 A1    11/1992
FR     2566523 A1    12/1985

* cited by examiner

*Primary Examiner* — Jewel V Thompson
(74) *Attorney, Agent, or Firm* — Cantor Colburn LLP

(57) ABSTRACT

The invention concerns a fluid turbine flow meter including a rotatable longitudinal body of a turbine equipped with longitudinal blades and regularly distributed support arms of the blades connecting the blades to the rotatable body of the turbine, where each blade has on the support arm a plurality of separate longitudinal thrust members the cross sections of which are adapted to receive the thrust of the fluid jet when the blade is active and to allow circulation of fluid between the thrust members when the blade is inactive.

12 Claims, 2 Drawing Sheets

FLUID TURBINE FLOW METER

TECHNICAL FIELD

The present invention concerns the field of fluid turbine flow meters, notably liquid turbine meters designed to measure water consumption.

The invention is more particularly suited to a single-jet or multi-jet fluid turbine flow meter.

BACKGROUND

A fluid turbine flow meter includes a casing comprising a measurement chamber into which lead an inlet pipe and an outlet pipe and a turbine having blades and driven in rotation in the measurement chamber by the jet of fluid entering via the inlet pipe and acting on one or more blades.

The fluid turbine flow meter also includes a casing containing a counter for counting the number of turns of the turbine, to which the latter is coupled by a magnetic transmission in the case of a dry counter and by a mechanical transmission in the case of an immersed counter, and a transparent cover covering the counter.

A problem currently encountered in the case of velocity turbine meters resides in the fact that at low flow rates the inactive blades that are not driven by the jet of fluid entering the measurement chamber, in other words that are not subjected to the driving thrust of the fluid, slow down the turbine.

In particular, when the fluid turbine flow meter is operating at a low flow rate, because of the low velocity of the flow the turbine is slowed down and the performance of the meter in terms of flow rate measurement is reduced.

There exists a requirement to find a technical solution that would make it possible to reduce measurement errors at low flow rates by limiting the hydraulic braking effect of the movement of the inactive blades in the fluid at the same time as preserving a maximum driving force when the jet of fluid impinges on the active blade or blades.

BRIEF SUMMARY

In this context, the present invention has the object of proposing a fluid turbine flow meter free of the above limitation.

To this end, a fluid turbine flow meter including a rotatable longitudinal turbine body equipped with longitudinal blades and regularly distributed blade support arms connecting the blades to the rotatable turbine body, is noteworthy in that each blade has a plurality of separate longitudinal thrust members on the support arm, the cross sections of which are adapted to receive the thrust of the fluid jet when the blade is active and to allow circulation of fluid between the thrust members when the blade is inactive.

In the preferred embodiment of the invention, each blade has on the support arm two longitudinal thrust members separated by a fluid passage space, a first thrust member, a second thrust member being arranged relative to a first thrust member to limit entry of the fluid jet into the fluid passage space when the blade is active and to allow circulation of fluid in a downstream to upstream direction in the fluid passage space when the blade is inactive.

The first thrust member and the rotatable body of the turbine are advantageously separated by a second fluid passage space so that fluid circulates in the second fluid passage space along an exterior longitudinal wall of the rotatable body of the turbine in a downstream to upstream direction.

The two thrust members of the blade on the support arm, when taken together, have in cross section relative to the longitudinal axis of the turbine substantially an L-shape the longer branch of which L-shape is discontinuous, this discontinuity being the first fluid passage space.

The first thrust member includes a bearing and thrust area having a curved surface transverse to the longitudinal axis of the turbine.

The bearing area of the first thrust member and a bearing area of the second thrust member together form in cross section relative to the longitudinal axis of the turbine a of curved, oval or substantially circular-arc-shaped surface.

The first thrust member includes a transverse surface having a concave curvature in its bearing and thrust area and a convex curvature at the end of this bearing area to guide the fluid jet toward the first fluid passage space of an inactive upstream blade and the second fluid passage space of the inactive upstream blade after it has impinged on the bearing and thrust area.

The first thrust member includes a longitudinal body having in cross section relative to the longitudinal axis of the turbine a substantially trihedral shape comprising a rear wall, a thrust front wall and a longitudinal wall facing an exterior longitudinal wall of the rotatable body to form the second fluid passage space in the downstream to upstream direction.

The second thrust member includes a longitudinal member having in cross section relative to the longitudinal axis of the turbine a substantially triangular shape that includes a rear wall, an end front wall and a front wall part of which faces the rear wall of the first thrust member to form the first fluid passage space.

The support arm includes a rear shell (or wall) for supporting the second thrust member, two rear shells for supporting the first thrust member, and a front shell for supporting the first thrust member.

For example, the turbine includes 3 to 12 blades, the first passage space and the second passage space have a dimension of a few millimeters, the diameter of the turbine is 5 cm and the length of the turbine is 15 mm.

BRIEF DESCRIPTION OF THE DRAWINGS

Other features and advantages of the invention will emerge clearly from the description thereof given hereinafter by way of non-limiting illustration and with reference to the appended drawings, in which.

DETAILED DESCRIPTION

The word "fluid" refers to water or any liquid or gas with which the fluid turbine flow meter described hereinafter is usable.

Figure 1:
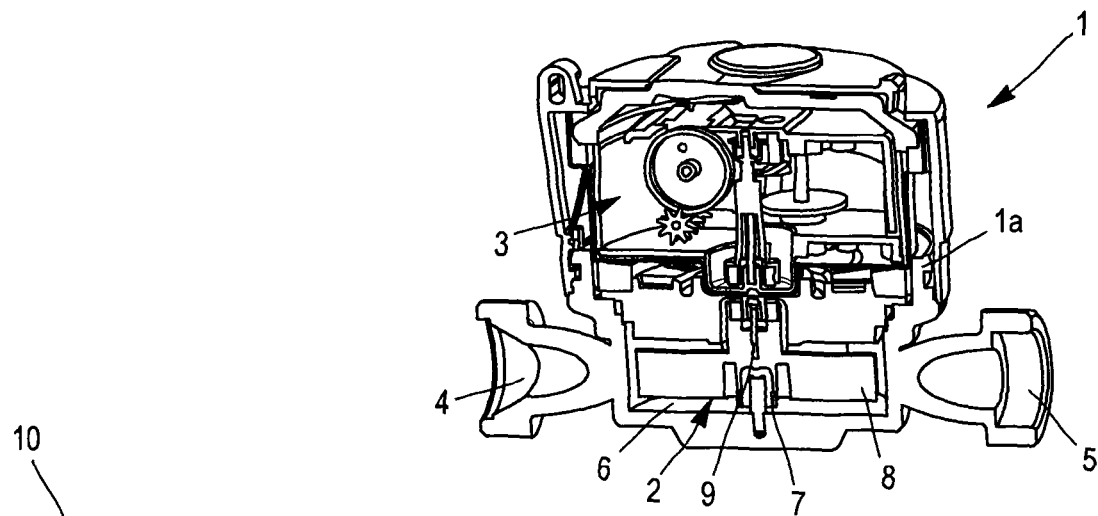
FIG. 1 represents a perspective view of the interior of a prior art fluid turbine flow meter in which a turbine in accordance with the invention may be accommodated.

Referring to FIG. 1, there is shown a prior art single-jet fluid turbine flow meter 1 that includes a hydraulic part 2 in which the liquid flows and a counter 3 on which metering data is displayed.

To be more precise, this meter includes a fluid meter casing 1a made of bronze or brass, for example, of generally cylindrical shape and circular section having a fluid inlet tube 4 and a fluid outlet tube 5 on respective opposite sides of a measurement chamber 6 for measuring the volume of fluid flowing in the inlet tube 4 and the outlet tube 5.

The measurement chamber 6 has a cylindrical shape coaxial with the casing 1a.

The casing 1a contains the counter 3 in the cylindrical upper part which is coaxial with the measurement chamber 6 but of larger diameter.

At the bottom of the casing 1a and in the center of the measurement chamber 6, is mounted a step bearing 7 about which the mobile part 8 of the meter turns.

The mobile part 8 of the meter includes a turbine body which constitutes the driving element of the fluid meter 1 and is fastened to a vertical shaft 9.

The turbine includes blades driven in rotation in the measurement chamber 6 by the effect of the jet of fluid directed onto a blade from the inlet pipe 4.

The turbine and the counter 3 are coupled by a transmission, here a magnetic transmission.

Gear mechanisms known in the art and connected to the transmission enable the number of turns effected by the turbine to be counted in the counter 3.

The number of turns effected by the turbine is displayed by an indicator which may be mechanical or electronic.

A sealing ring enables the counter 3 to be fixed to the casing 1a of the measurement chamber 6.

The turbine 10 in accordance with the invention may be applied to this type of single-jet turbine (velocity) flow meter.

It may equally be applied to other single-jet fluid turbine (velocity) flow meter embodiments, not shown, employing other means for fixing the turbine in the measurement chamber.

In particular, the cylindrical body of the turbine may notably have an interior wall delimiting a housing into which is inserted and fixed a cylindrical sleeve, not shown in the figures, which includes a rotation shaft of the turbine, this rotation shaft bearing on an axial thrust bearing of the measurement chamber.

In this case a bearing that is arranged relative to the sleeve and is not shown supports the rotation shaft of the turbine 10 in the measurement chamber.

On the other hand, the turbine 10 in accordance with the invention is also usable for multi-jet fluid turbine flow meters, in particular for the inactive blades in the upper part of the measurement chamber through which water is evacuated from the measurement chamber.

For simplicity, the remainder of the description refers to the longitudinal axis A of the turbine 10 which extends in the direction of the height or length of the turbine 10 and coincides with the rotation axis of the turbine 10.

The term "upstream" designates the front part of a blade 11, which is directly in contact with the jet of fluid, the term "downstream" designates the rear part of the blade 11, which does not receive the jet of fluid directly, and the term "transverse" designates any direction in a plane perpendicular to the longitudinal axis A.

Figure 2:
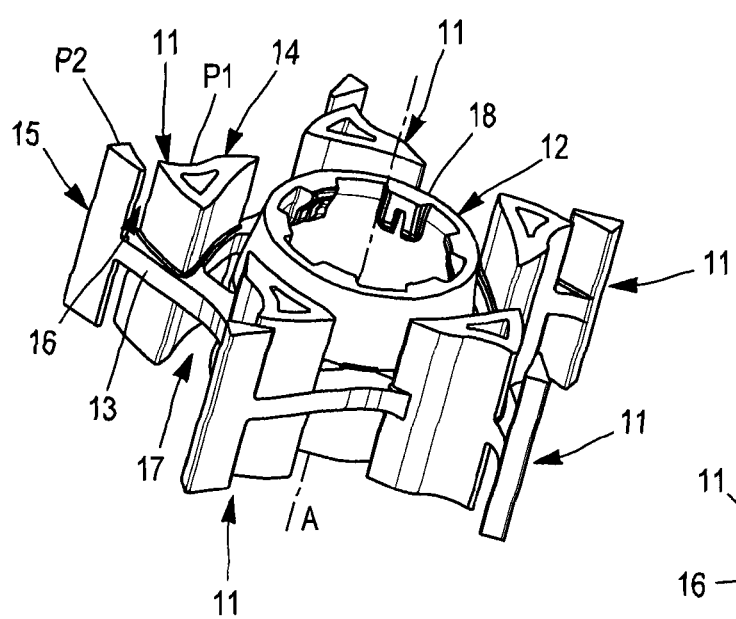
FIG. 2 represents a perspective view of a turbine in accordance with the invention.
Figure 3:
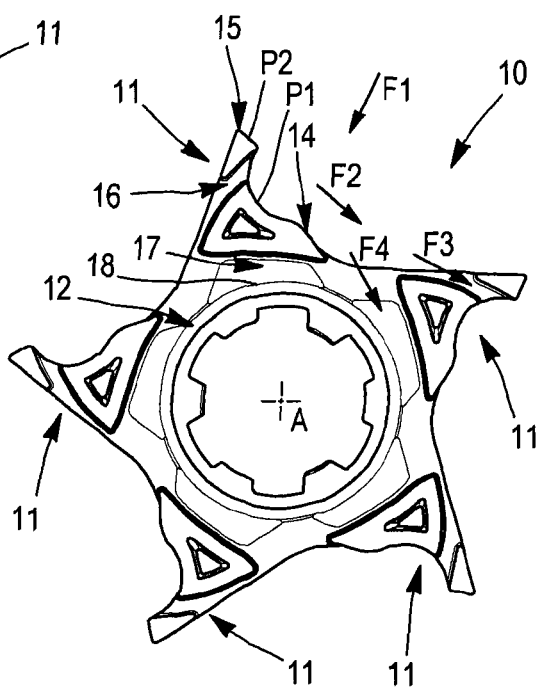
FIG. 3 represents a plan view of the turbine in accordance with the invention.

Referring to FIGS. 2 and 3, the turbine 10 in accordance with the invention includes a cylindrical central rotatable body 12 equipped with regularly distributed peripheral support arms 13 and blades 11 each disposed on a support arm 13.

Each blade 11 includes two thrust members 14 and 15 on the support arms 13, comprising a first or main thrust member 14 and a second or end thrust member 15.

These thrust members 14 and 15 have cross sections with respect to the longitudinal axis A adapted to receive a jet of fluid on bearing and thrust areas P1 and P2 when the blade 11 is active, the thrust being exerted essentially on the first or main thrust member 14, the thrust area P1 being larger and more exposed to the jet of fluid than the thrust area P2.

The cross sections of these thrust members 14 and 15 are also arranged and positioned on the support arm 13 and relative to the cylindrical body 12 of the turbine 10, so as to allow circulation of fluid in the downstream to upstream direction, between them and between the first thrust member 14 and the cylindrical body 12 when the blade 11 is inactive.

To be more precise, in the embodiment of the invention shown in FIGS. 2 to 5, the two thrust members 14 and 15 are separated by a first fluid passage space 16 having in cross section substantially the shape of a channel.

A second fluid passage space 17 is provided between the first thrust member 14 supported longitudinally by the support arm 13 and an exterior longitudinal wall 18 of the cylindrical body 12 of the turbine 10.

The support arm 13 has a length less than that of the exterior longitudinal wall 18 of the cylindrical body 12.

By way of illustrative example only, the support arms 13 have a length equal to one eighth of the length of the exterior longitudinal wall 18, which allows a large quantity of fluid to circulate in the second fluid passage space 17.

Moreover, as can be seen in FIGS. 2 to 5, the support arms 13 are, substantially, in the middle of the length of the exterior longitudinal wall 18.

To increase the thrust of the jet on the blades 11, they are inclined relative to a straight line tangential to their articulation with the cylindrical body 12 of the turbine 10 at an angle, by way of non-limiting example, between 20 and 60°.

The first thrust member 14 and the second thrust member 15 have longitudinal bodies that extend over substantially the same length as the exterior longitudinal wall 18 of the cylindrical body 12 of the turbine 10.

The two thrust members 14 and 15 have, taken together on the support arm 13, a substantially L-shaped cross section and the longer branch of the L-shape is discontinuous.

The first or main thrust member 14 constitutes the smaller branch of the L-shape and a lower part of the larger branch of the L-shape.

The second thrust member 15 constitutes the upper part of the larger branch of the L-shape.

The first fluid passage space 16 constitutes the discontinuity in the larger branch of the L-shape between the first thrust member 14 and the second thrust member 15.

Figure 4:
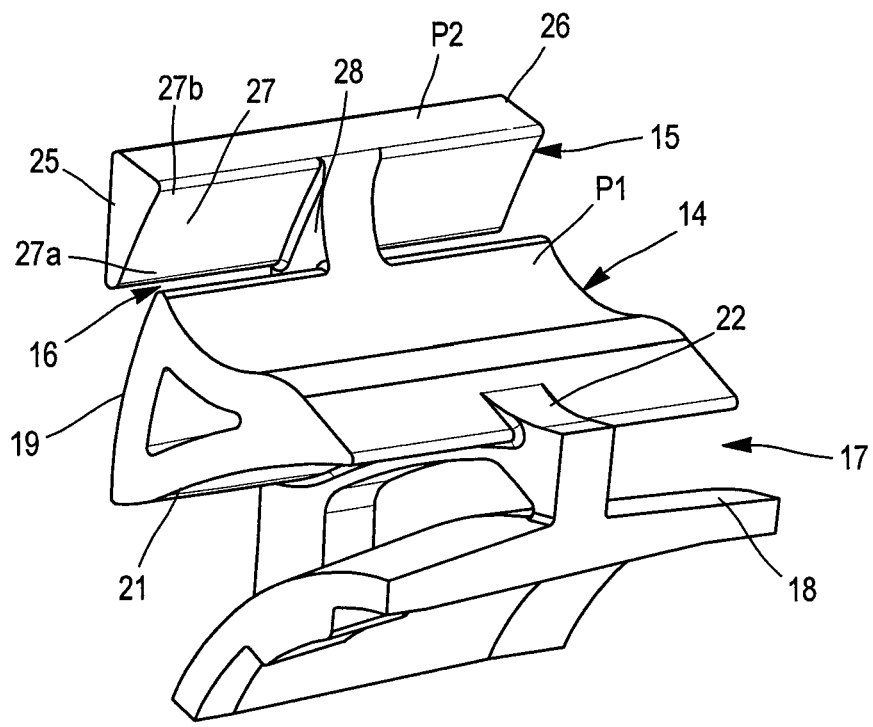
FIG. 4 represents a perspective view from the front of a blade of the turbine in accordance with the invention.
Figure 5:
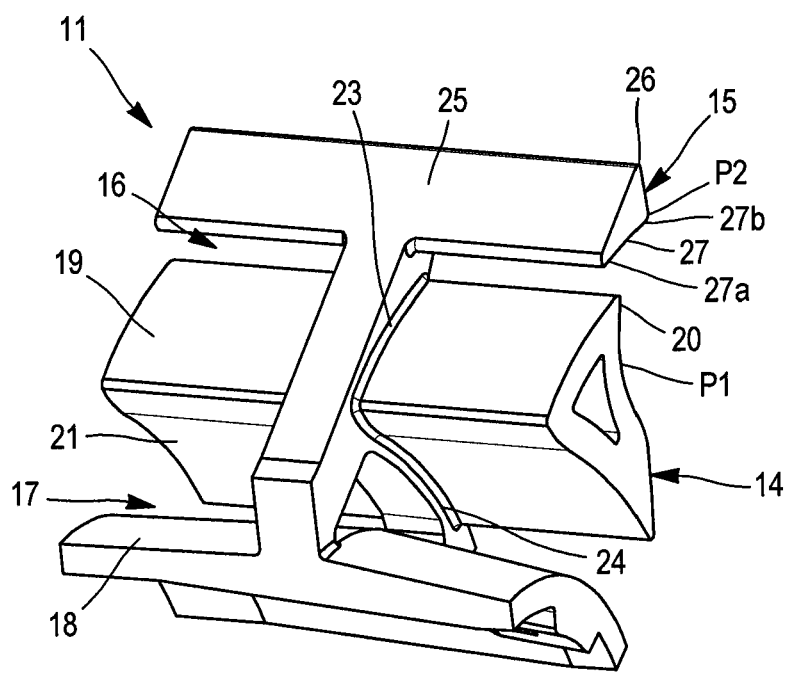
FIG. 5 represents a perspective view from the rear of the blade of the turbine in accordance with the invention.

As shown in FIG. 4, the first thrust member 14 includes a hollow longitudinal body having in cross section a substantially trihedral surface formed by a rear wall 19, a front thrust wall 20 including the thrust area P1, and a longitudinal wall 21.

This longitudinal wall 21 faces the exterior longitudinal wall 18 of the cylindrical body 12 to form the second fluid passage space 17.

On the support arm 13, the first thrust member 14 is retained by a front shell (or wall) 22 which supports the front wall 20 and by a first rear shell (or wall) 23 and a second rear shell (or wall) 24 which respectively support the rear wall 19 and the longitudinal wall 21 substantially in the middle of their length.

The first thrust member 14 includes on the front thrust wall 20 the bearing and thrust area P1 of the fluid jet which in cross section relative to the longitudinal axis A has a surface of concave curvature (recessed surface).

The first thrust member 14 includes on the front wall 20 at one end of its bearing and thrust area P1 a transverse surface of convex curvature (domed surface), this curvature being reversed relative to the concave curvature of the bearing and thrust area P1, to guide the fluid jet toward the first fluid passage space 16 and the second fluid passage space 17 of an inactive upstream blade 11 after the fluid jet has impinged on the bearing and thrust area P1.

Accordingly, the fluid jet impinges on the bearing and thrust area P2 of the second thrust member 15 on the active blade 11 and then on the bearing and thrust area P1 of the first thrust member 14, thereafter to be redirected and recirculated toward the first fluid passage space 16 and the second fluid passage space 17 of the preceding inactive blade 11, as indicated by the arrows F1, F2, F3 and F4 in FIG. 3.

As shown in FIG. 4, the second thrust member 15 includes a rectilinear longitudinal member taking the form of a rod with a substantially triangular cross section formed by a rear wall 25, an end first front wall 26 and a second front wall 27.

The two front walls 26 and 27 include the bearing and thrust area P2.

The front wall 27 includes a rear part 27a facing the rear wall 19 of the first thrust member 14 to form the first passage space 16 and a front part 27b in front of and projecting toward the upstream or front part of the blade 11 relative to the fluid jet F1 and providing the thrust.

The second front wall 27 and the bearing and thrust area P1 are arranged on the support arm 13 so as to have in cross section, taken together, a surface in contact with the fluid jet of curved shape, for example of oval or substantially circular arc shape, as shown in FIG. 3.

Any shape of the surface in contact with the fluid jet can be used for the bearing and thrust areas P1 and P2. For example, without departing from the scope of the invention, a flat surface perpendicular to the fluid jet may be used.

The arrangement of the second thrust member 15 in front of, or projecting, relative to the first thrust member 14 on the upstream side, the area of the thrust area P2 being smaller than that of the thrust area P1, and the velocity of the fluid jet F1 allow very little of the fluid jet into the first passage space 16 of the active blade when the fluid jet F1 acts on the thrust areas P1 and P2.

The front wall 27 of the second thrust member 15 is substantially parallel to the rear wall 19 of the first thrust member 14.

Alternatively, it may be inclined in the upstream direction relative to the rear wall 19 of the first thrust member 14, for example at an angle of 10°, so as to have a section of the first passage space 16 larger downstream of the blade 11 than upstream thereof to reinforce prevention of the fluid jet entering the first passage space 16 when the blade 11 is active and to allow circulation of fluid in the downstream-to-upstream direction when the blade 11 is inactive.

The middle of the rear wall 27 bears on an inclined end rear shell 28 of the support arm 13.

The turbine 10 may be produced in one piece, for example by thermoplastic injection molding.

The turbine 10 has five blades, but this number is not limiting on the invention. For example, it may have from 3 to 12 blades.

This turbine can be made with any dimensions for any type of fluid turbine flow meter.

By way of non-limiting example, for a turbine having a diameter of 5 cm and a length of 15 mm along the longitudinal axis A, the first passage space 16 and the second passage space 17 have dimensions of a few millimeters.

The invention claimed is:

1. Fluid turbine flow meter including a rotatable longitudinal body of a turbine equipped with longitudinal blades and regularly distributed support arms of the blades connecting the blades to the rotatable body of the turbine, wherein each blade has several separate longitudinal thrust members on the support arm, the cross sections of which are adapted to receive the thrust of the fluid jet when the blade is active and to allow circulation of fluid between the thrust members when the blade is inactive.

2. Fluid turbine flow meter according to claim 1, wherein each blade has on the support arm two longitudinal thrust members separated by a fluid passage space, a second thrust member being arranged relative to a first thrust member to limit entry of the fluid jet into the fluid passage space when the blade is active and to allow circulation of fluid in a downstream-to-upstream direction in the fluid passage space when the blade is inactive.

3. Fluid turbine flow meter according to claim 2, wherein the first thrust member and the rotatable body of the turbine are separated by a second fluid passage space so that fluid circulates in the second fluid passage space along an exterior longitudinal wall of the rotatable body of the turbine in a downstream-to-upstream direction.

4. Fluid turbine flow meter according to claim 3, wherein the two thrust members of the blade on the support arm have together, in cross section relative to the longitudinal axis of the turbine, substantially an L-shape, the longer branch of which L-shape being discontinuous, this discontinuity constituting the first fluid passage space.

5. Fluid turbine flow meter according to claim 2, wherein the first thrust member includes a bearing and thrust area having a curved surface transverse to the longitudinal axis of the turbine.

6. Fluid turbine flow meter according to claim 2, wherein the bearing area of the first thrust member and a bearing area of the second thrust member form together, in cross section relative to the longitudinal axis of the turbine, a surface that is of curved, oval or substantially circular arc shape.

7. Fluid turbine flow meter according to claim 5, wherein the first thrust member includes a transverse surface having a concave curvature for its bearing and thrust area and a convex curvature at the end of this bearing and thrust area, to guide the fluid jet toward the first fluid passage space of an inactive upstream blade and the second fluid passage space of the inactive upstream blade after the fluid jet has impinged on the bearing and thrust area.

8. Fluid turbine flow meter according to claim 3, wherein the first thrust member includes a longitudinal body having in cross section relative to the longitudinal axis of the turbine a substantially trihedral shape comprising a rear wall, a thrust front wall and a longitudinal wall facing the exterior longitudinal wall of the rotatable body to form the second fluid passage space in the downstream-to-upstream direction.

9. Fluid turbine flow meter according to claim 8, wherein the second thrust member includes a longitudinal member, having in cross section relative to the longitudinal axis of the turbine, a substantially triangular shape that includes a rear wall, an end front wall and a front wall part of which faces the rear wall of the first thrust member to form the first fluid passage space.

10. Fluid turbine flow meter according to claim 2, wherein the support arm includes a rear shell for supporting the second thrust member, two rear shells for supporting the first thrust member, and a front shell for supporting the first thrust member.

11. Fluid turbine flow meter according to claim 1, wherein the turbine includes 3 to 12 blades.

12. Fluid turbine flow meter according to claim 3, wherein the first passage space and the second passage space have a dimension of a few millimeters, the diameter of the turbine is 5 cm and the length of the turbine is 15 mm.

\* \* \* \* \*